United States Patent
Sarkar

(10) Patent No.: US 6,990,091 B2
(45) Date of Patent: Jan. 24, 2006

(54) METHOD AND APPARATUS FOR FAST WCDMA ACQUISITION

(75) Inventor: Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 718 days.

(21) Appl. No.: 10/044,192

(22) Filed: Oct. 26, 2001

(65) Prior Publication Data

US 2002/0057664 A1    May 16, 2002

Related U.S. Application Data

(63) Continuation of application No. 09/345,283, filed on Jun. 30, 1999.

(51) Int. Cl.
   *H04B 7/26*    (2006.01)
(52) U.S. Cl. ...................... 370/342; 375/145
(58) Field of Classification Search ................ 370/535, 370/336, 342, 341, 325, 324, 315, 363, 328, 370/509, 512; 375/149, 140, 141, 150
   See application file for complete search history.

(56) References Cited

U.S. PATENT DOCUMENTS

| | | | |
|---|---|---|---|
| 4,052,565 A | 10/1977 | Baxter et al. ................. 179/1.5 |
| 4,301,530 A | 11/1981 | Gutleber ..................... 370/18 |
| 4,460,992 A | 7/1984 | Gutleber ..................... 370/19 |
| 4,472,815 A | 9/1984 | Gutleber ..................... 375/34 |
| 4,635,221 A | 1/1987 | Kerr ........................... 364/821 |
| 4,730,340 A | 3/1988 | Frazier, Jr. .................. 375/1 |
| 4,872,200 A | 10/1989 | Jansen ........................ 380/34 |
| 4,901,307 A | 2/1990 | Gilhousen et al. ........... 370/18 |
| 4,933,952 A | 6/1990 | Albrieux et al. ............. 375/1 |
| 4,939,745 A | 7/1990 | Kirimoto et al. ............ 375/1 |
| 5,101,501 A | 3/1992 | Gilhousen et al. ........... 455/33 |
| 5,103,459 A | 4/1992 | Gilhousen et al. ........... 375/1 |
| 5,177,765 A | 1/1993 | Holland et al. .............. 375/1 |
| 5,179,571 A | 1/1993 | Schilling ..................... 375/1 |
| 5,363,401 A | 11/1994 | Lucas et al. ................. 375/1 |
| 5,400,359 A | 3/1995 | Hikoso et al. ............... 375/1 |
| 5,509,035 A | 4/1996 | Teidemann, Jr. et al. ... 375/356 |
| 5,615,209 A * | 3/1997 | Bottomley ................... 370/342 |
| 5,896,368 A * | 4/1999 | Dahlman et al. ........... 370/335 |

(Continued)

FOREIGN PATENT DOCUMENTS

WO         9200639         1/1992

(Continued)

OTHER PUBLICATIONS

Chase, David "A Class of Algorithms for Decoding Block Codes with Channel Measurement Information" IEEE Transactions on Information Theory IT-18(1): 170-182 (1972).

(Continued)

*Primary Examiner*—Hassan Kizou
*Assistant Examiner*—Ricardo Pizarro
(74) *Attorney, Agent, or Firm*—Philip R. Wadsworth; Thien T. Nguyen; Roberta A. Young

(57) ABSTRACT

A method and apparatus for quickly acquiring synchronization of a signal in a WCDMA communication system utilizing variable duration sample accumulation, validity testing of decoder estimates, and parallel decoding of multiple synchronization signals within a PERCH channel. The receiver accumulates the samples necessary to reliably determine slot timing. Until slot timing estimates pass a validity test, samples are accumulated for frame timing estimates. Until frame timing estimates pass a validity test, samples are analyzed to determine the pilot offset of the channel.

26 Claims, 9 Drawing Sheets

U.S. PATENT DOCUMENTS

| | | | | |
|---|---|---|---|---|
| 5,930,366 A | * | 7/1999 | Jamal et al. | 370/509 |
| 5,991,330 A | * | 11/1999 | Dahlman et al. | 375/149 |
| 6,185,244 B1 | * | 2/2001 | Nystrom et al. | 375/145 |
| 6,404,758 B1 | * | 6/2002 | Wang | 370/342 |
| 6,504,830 B1 | * | 1/2003 | Ostberg et al. | 370/342 |
| 6,717,930 B1 | * | 4/2004 | Sezgin et al. | 370/335 |
| 6,728,229 B1 | * | 4/2004 | Lim | 370/335 |
| 6,728,297 B2 | * | 4/2004 | Rudolf | 375/145 |
| 6,731,673 B1 | * | 5/2004 | Kotov et al. | 375/145 |
| 6,741,578 B1 | * | 5/2004 | Moon et al. | 370/335 |
| 6,754,251 B1 | * | 6/2004 | Sriram et al. | 375/145 |
| 6,760,366 B1 | * | 7/2004 | Wheatley et al. | 375/152 |
| 6,791,960 B1 | * | 9/2004 | Song | 370/335 |

FOREIGN PATENT DOCUMENTS

| | | |
|---|---|---|
| WO | 9900912 | 1/1999 |

OTHER PUBLICATIONS

Kreyszig, Erwin *Advanced Engineering Mathematics*, Chapter 4, section 4.7, pp. 186-190, John Wiley & Son, Inc. (1979).

Viterbi, et al. "Nonlinear Estimation of PSK-Modulated Carrier Phase with Application to Burst Digital Transmission" IEEE Transactions on Information Theory IT-29(4): 543-551 (1983).

* cited by examiner

METHOD AND APPARATUS FOR FAST WCDMA ACQUISITION

CROSS REFERENCE

This application is a continuation application of U.S. Pat. No. 6,363,060, issued Mar. 26, 2002 entitled "Method and Apparatus for Fast WCDMA Acquisition" and currently assigned to the assignee of the present application.

FIELD OF THE INVENTION

The present invention relates to wireless communications. More particularly, the present invention relates to an improved method of achieving synchronization with, and identifying a received signal in an asynchronous code division multiple access (CDMA) system.

BACKGROUND

The International Telecommunications Union recently requested the submission of proposed methods for providing high rate data and high-quality speech services over wireless communication channels. One of the proposals was issued by the European Telecommunications Standards Institute (ETSI), entitled "The ETSI UMTS Terrestrial Radio Access (UTRA) ITU-R RTT Candidate Submission", hereafter referred to as WCDMA. The contents of these submissions is public record and is well known in the art, and describes the use of PERCH channels in a WCDMA system as discussed herein.

FIG. 1 illustrates the parts of a frame transmitted on the WCDMA PERCH channel by each base station in a WCDMA communication system used to permit the mobile station to acquire synchronization with the base station.

A frame is 10 milliseconds in duration and consists of 40,960 chips. A frame is divided into 16 slots, each slot having 2560 chips. Each slot can then be thought of as being divided into 10 consecutive parts, each part consisting of 256 chips. For the purposes of this disclosure, the 10 parts of each slot are numbered from 1 to 10, with 1 being the earliest transmitted 256 chips of each slot.

The first 256 chips (part 1) of each slot in the frame consist of two orthogonal sequences, which are transmitted on top of one another. The first of the two orthogonal sequences is the primary synchronization code (PSC) sequence. The PSC sequence is the same sequence for every slot and for every base station in a WCDMA system. The second of the two orthogonal sequences transmitted in part 1 is the secondary synchronization code (SSC). One of seventeen possible SSC sequences is transmitted in each slot.

Parts 2 through 5 of each slot include broadcast data such as the system identity of the transmitting base station and other information that is of general use to all mobile stations in communication with that base station. Parts 6 through 10 of each slot are used to carry a pilot signal that is generated in accordance with an Orthogonal Gold code as defined by the aforementioned UTRA standard.

Since the PSC and SSC signals are transmitted during the same 256 chip part of each frame, each is transmitted at half the power of the signals in the other parts. In other words, the PSC signal is transmitted at a power of 3 dB less than the signals in parts 2 through 10 of each slot. The SSC signal is also transmitted at −3 dB compared to signals in parts 2 through 10. Though this makes PSC and SSC detection more difficult, it keeps the transmission signal power constant throughout each frame.

FIG. 2 illustrates the apparatus used to generate the PERCH channel used for initial system acquisition in the proposed WCDMA Third Generation communication system. Primary Synchronization code (PSC) generator 1 generates a predetermined 256 chip sequence that is used for the first stage of system acquisition described later herein. The PSC is the same for all base stations in the communication system and is punctured into the first 256 chips of each slot of each frame.

In WCDMA systems, each base station spreads its transmissions using an orthogonal Gold code. The generation of orthogonal Gold codes is well known in the art. In WCDMA, all of the Gold codes are generated using the same generator polynomial. There are a total of 512 possible timing offsets of the Gold code for a given base station. These offsets are measured with respect to the start of a frame and not with respect to any centralized timing signal. The time-offset Gold code is truncated at the end of each ten millisecond frame, and then repeats from the offset point at the start of each frame.

WCDMA base stations transmit a secondary synchronization code (SSC) that serves two functions. First, the secondary synchronization code is used to identify the frame timing of a base station. Second the secondary synchronization code provides a group identification (GI), which narrows down the orthogonal Gold code offset to a subset of sixteen of the possible 512 offsets. In the proposed WCDMA systems, there are 32 different Group Identities, each associated with a set of sixteen Gold code offsets.

The group identification is provided to SSC outer coder 2. The group identification is mapped to one of 32 possible 16 element code words wherein each of the elements takes on one of seventeen possible values. The code words are selected as comma free codes such that any cyclic shift of any of the code words results in a vector that is not a legitimate code word. The elements of the code word are then provided to SSC inner coder 3 which maps each of the elements of the code words into a 256 chip sequence. Each of the possible 256 chip SSC sequences into which an element of the code word can be mapped is orthogonal to any other sequences used to encode an element of a code word. Each of the possible 256 chip SSC sequences is also orthogonal to the 256 chip sequence used by the PSC. Each of the sixteen 256 chip SSC sequence is added to the PSC sequence punctured into the first 256 chips of part 1 of the slots in each frame.

The PSC sequence and the SSC sequence are summed in adder 6. Because the sequences are orthogonal to one another they can be distinguished from one another at the receiver and will not, in a single path analysis, interfere with one another. In addition, broadcast common data is punctured into parts 2 through 5 of each slot of the frame. The remaining 1280 chips (occupying parts 6 through 10) of the slots in each frame consist of the remaining unpunctured chips of the orthogonal Gold code sequence used to spread the transmissions from the base station. The first 1280 chips of the orthogonal Gold code sequence within each slot is punctured out by the PSC/SSC and common broadcast information.

FIG. 3 illustrates the current state of the art in acquiring synchronization in a WCDMA communication system. The signal is received at antenna 10 and provided to receiver (RCVR) 11. Receiver 11 down converts, amplifies and samples the received signal and provides the samples to Primary Synchronization code (PSC) detector 12. The PSC is redundantly transmitted in part 1 of each of the sixteen slots of each frame. The PSC is transmitted at a very low power using very weak coding that is prone to false detection. In order to reduce the probability of false detection to an acceptable level, currently contemplated systems accumulate three full frames of samples into a buffer.

The following description will assume that the sampling is 1× and real samples only are taken. In reality the WCDMA system uses QPSK modulation so the sampling will be complex and oversampling is desirable to increase the likelihood of accurate detection.

Slot buffer 14 is a circular buffer that is capable of holding 2560 samples. The elements of slot buffer 14 are initialized to zero at the start of slot timing acquisition. The first 2560 samples are provided directly to slot buffer 14. Thereafter, the samples received over the remainder of three frame periods are summed in summer 13 with corresponding accumulated sample values stored in slot buffer 14 in accordance with equation (1) below:

$$\text{ACCUM\_SAMP}(i) = \text{ACCUM\_SAMP}(i) + \text{NEW\_SAMP}(i+2560n), \quad (1)$$

where i is a slot chip number between 0 and 2559, ACCUM_SAMP(i) is the $i^{th}$ value stored in slot buffer 14, NEW_SAMP(i) is the $i^{th}$ sample received and n is a slot number from 0 to 47 (corresponding to the number of slots in 3 full frames).

For the first 30 milliseconds of signal accumulation, switch 30 is set so that the values output by summer 13 are stored back into slot buffer 14. At the completion of the signal accumulation period, switch 30 moves so as to provide the output values from summer 13 to correlator 15. The function of correlator 15 is to detect the PSC sequence within the 2560 possible locations in slot buffer 14. It will be understood by one skilled in the art that slot buffer 14 is a circular buffer that allows wrap around addressing to test all possible hypotheses. Correlator 15 correlates 256 accumulated signal samples with the 256 chip PSC sequence and provides the resulting 2560 calculated correlation energies to maximum detector (MAX DETECT) 16. Maximum Detector 16 detects the point of highest correlation with the PSC sequence in the stored accumulated samples.

By detecting the PSC within the slots, the receiver has acquired slot level timing synchronization, whereby the receiver knows where each of the slots of the frame begin. The slot timing information is provided to multiplexer 31. In reality, the slot timing information would be provided to a control processor (not shown) that would control the operation of multiplexer 31 using the slot timing information.

The SSC is also transmitted at low energy and in order to attain sufficient confidence in the received signal would require accumulation of two redundantly transmitted SSC symbols. Unlike the PSC, which is the same value for each slot, the SSC can take on one of seventeen possible values in each slot. Thus, in order to accumulate the SSC data it is necessary to accumulate the samples from slots of different frames. The SSC sequence in the eighth slot of a frame will not necessarily be the same as the SSC sequence in the ninth slot in that frame. However, the SSC sequence in the eighth slot of a given frame is the same as the SSC sequence in the eighth slot of the subsequent frame and can be meaningfully accumulated.

Multiplexer 31 receives the samples collected over multiple frame periods, each frame period coinciding with 16 consecutive slots. Multiplexer 31 provides the first 256 samples of each slot (part 1 of the slot containing the SSC sequence) to one of sixteen possible SSC inner code detectors 18, which function similarly to PSC detector 12. At the start of accumulating samples for SSC decoding, the SSC buffer 21 within each SSC inner code detector 18 is cleared by setting all elements to zero. Also, switches 20 are configured such that the values output by summers 19 are stored back into SSC buffers 21.

From the first frame period, part 1 of the first slot period is provided to SSC inner code detector 18a, part 1 of the second slot period is provided to SSC inner code detector 18b, and so on until part 1 of the sixteenth slot period is provided to SSC inner code detector 18p. During the second frame period, part 1 of the first slot period is again provided to SSC inner code detector 18a, part 1 of the second slot period is provided to SSC inner code detector 18b, and so on until part 1 of the sixteenth slot period is provided to SSC inner code detector 18p. In this way, the SSC sequences corresponding to each of the sixteen slots in each frame are accumulated over multiple frame periods.

After accumulating the SSC samples, switch 20 toggles to provide the stored accumulated samples from SSC buffer 21 to correlator 22. Correlator 22 computes the correlation energy between the accumulated samples and each of the seventeen possible legitimate sequences $(c_1, c_2, \ldots, c_{17})$ and provides the correlation energy to maximum detector (MAX DETECT) 23. Maximum detector 23 selects the legitimate sequence with the highest correlation energy and provides the sequence to SSC Outer Decoder 24. Upon receiving the sixteen sequence estimates from each of SSC inner code detectors 18, SSC outer decoder 24 determines the most likely transmitted sixteen element code word.

SSC outer decoder 24 converts the sequence estimates to code word elements $(c_1, c_2, \ldots, c_{17})$ and then compares the resulting code word to all legitimate code words and all cyclic-shifted versions of those legitimate code words. Upon selection of the most likely transmitted code word, the SSC Outer decoder has detected the frame timing and has decoded the group identification (GI) of the base station.

At this point, samples are stored to allow for pilot channel acquisition, the last of three steps toward acquiring base station timing. The pilot is a continuous orthogonal Gold code that has the broadcast data and PSC/SSC channel data punctured into the first half of every slot. The start of frame timing is used to reduce the amount of memory needed to perform acquisition of the orthogonal Gold code used to spread transmissions by the base station. Half frame buffer 27 stores only the second half of each slot in a frame, this being the portion not punctured by other information. Half frame buffer 27 stores 20,480 samples.

The decoded Group Identification is provided to Orthogonal Gold Code generator (OGC GEN) 25. In response to the Group Identification, Orthogonal Gold Code generator 25 selects a set of sixteen possible masks. A single polynomial is used to generate the sequences and ten millisecond truncated portions of that sequence that are used to perform the spreading operation. The particular portions of the sequence that are used for the spreading are selected by means of a masking operation that is well known in the art and described in detail in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

Generator 25 generates a 40,960-chip orthogonal Gold code sequence, which would be the sequence used to spread a ten millisecond transmission. The sequence from generator 25 is provided to gating element 26. Gating element 26 gates out the first half of each 625 $\mu$s period of the sequence output by generator 25 corresponding to the portions of the pilot channel punctured out by the PSC/SSC and broadcast common channel data in the transmission of the PERCH channel.

The gated sequences from gating element 26 are provided to correlator 28. Correlator 28 calculates the correlation between the locally generated and gated orthogonal Gold code sequence and the samples stored in half frame buffer 27. The correlation energy for each potential offset is provided to maximum detector 29. Because the receiver has already acquired frame level timing and because the Orthogonal Gold code sequence is reset at frame boundaries the only sixteen offset hypotheses ($O_1, O_2, \ldots, O_{16}$) need to be tested.

After testing the sixteen possible offset hypotheses, maximum detector 29 outputs the most likely offset. With the frame timing information and the mask used to perform the spreading, the receiver is now capable of receiving the paging channel and beginning two way communications with the transmitting base station.

In the current WCDMA proposal, PSC, SSC, and pilot offset decoding are attempted in a fixed number of frame periods until synchronization is achieved. Six frame periods at a time are analyzed, with the first three frames being used to estimate PSC slot timing, the next two frames being used to decode the SSC code word, and the last frame being used to decode the pilot. Each time one of these six-frame period elapses without satisfactory decoding of PSC, SSC, and pilot, the process starts anew with another six frames. Because the PSC and SSC sequences are transmitted at such low power compared with other parts of the frame, many such sets of frame periods typically elapse before all three types of information are successfully decoded in one set.

The problem with this method of acquiring synchronization is that it takes an average of 500 milliseconds to successfully acquire a WCDMA channel this way. This is much longer than the 200-milliseconds generally allowed in successfully completing a handoff in current CDMA wireless systems, and may result in calls dropping from unsuccessful handoff operations. Therefore, there is a need felt in the art for a method of more rapidly acquiring synchronization in a WCDMA communication system.

SUMMARY

The present invention may be used to acquire synchronization in a WCDMA communication system more quickly than currently proposed methods. Various embodiments of the invention utilize longer PSC and SSC sample accumulation periods and parallel decoding of PSC, SSC and pilot information to minimize the time required for synchronization.

The prior art method described above creates an estimate of PSC slot timing based on three frame periods of samples. If that estimate of slot timing turns out to be incorrect, subsequent decoding of SSC and pilot information will fail, and the collection of SSC samples begins anew. The samples used to form previous three-frame estimates of slot timing are discarded when forming subsequent three-frame slot timing estimates.

Embodiments of the invention allow longer PSC sample accumulation periods, instead of forcing a possibly inaccurate decision based on a few frames. Embodiments of the invention also incorporate tests for evaluating the validity of PSC slot timing estimates formed from accumulated samples. Further included are methods of continually accumulating PSC samples until a valid slot timing estimate is achieved. As only the PSC sequence is identical for every slot, accumulation of samples in a slot-wide buffer causes the PSC sequence to rise above the field of other accumulated values. As a slot timing estimate is generated which is the "best guess" at slot timing, but which does not pass the validity test, it is used as a reference for preliminary SSC sample accumulation. If this "best guess" slot timing estimate is later validated by passing the test, then the SSC samples accumulated are used in decoding the SSC code word. This parallel sample accumulation enables embodiments of the invention to accomplish more reliable decoding of the SSC code word after a shorter sample accumulation period.

Embodiments of the invention further incorporate parallel processing of the SSC code and the pilot offset. The SSC decoding process also involves a validity test, but generate an intermediate "best guess" SSC code, which is used to estimate the pilot offset. If subsequent sample accumulation of the SSC code supports the validity of the "best guess" SSC code, then the corresponding pilot offset estimate may be immediately used. This method is called parallel, because the pilot offset is decoded simultaneously with the SSC.

In the various embodiments of the present invention, parallel processing of accumulated sample values lead to quicker synchronization with a WCDMA channel. Utilizing these embodiments, synchronization may be achieved in as little as 10 or 30 milliseconds for a strong received signal level. Even if the received signal is weak, however, the more efficient use of accumulated samples allowed by the present invention leads to faster synchronization than the prior art techniques.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
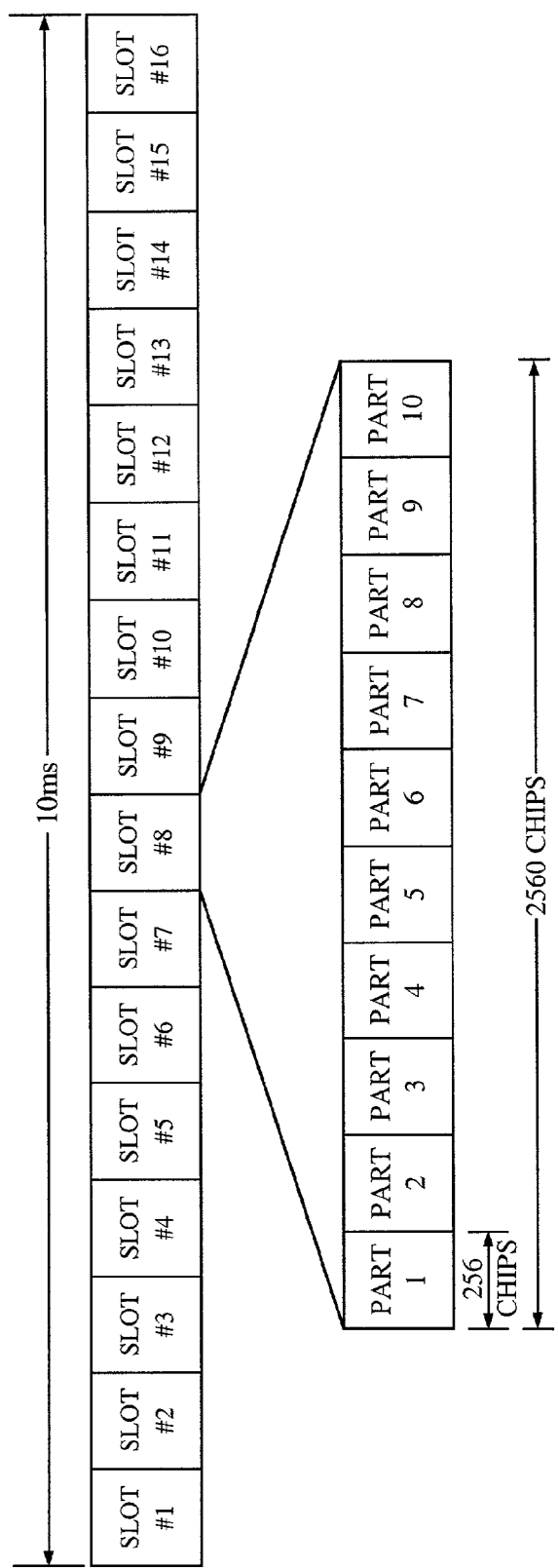
FIG. 1 is a diagram of the structure of a WCDMA PERCH channel.
Figure 2:
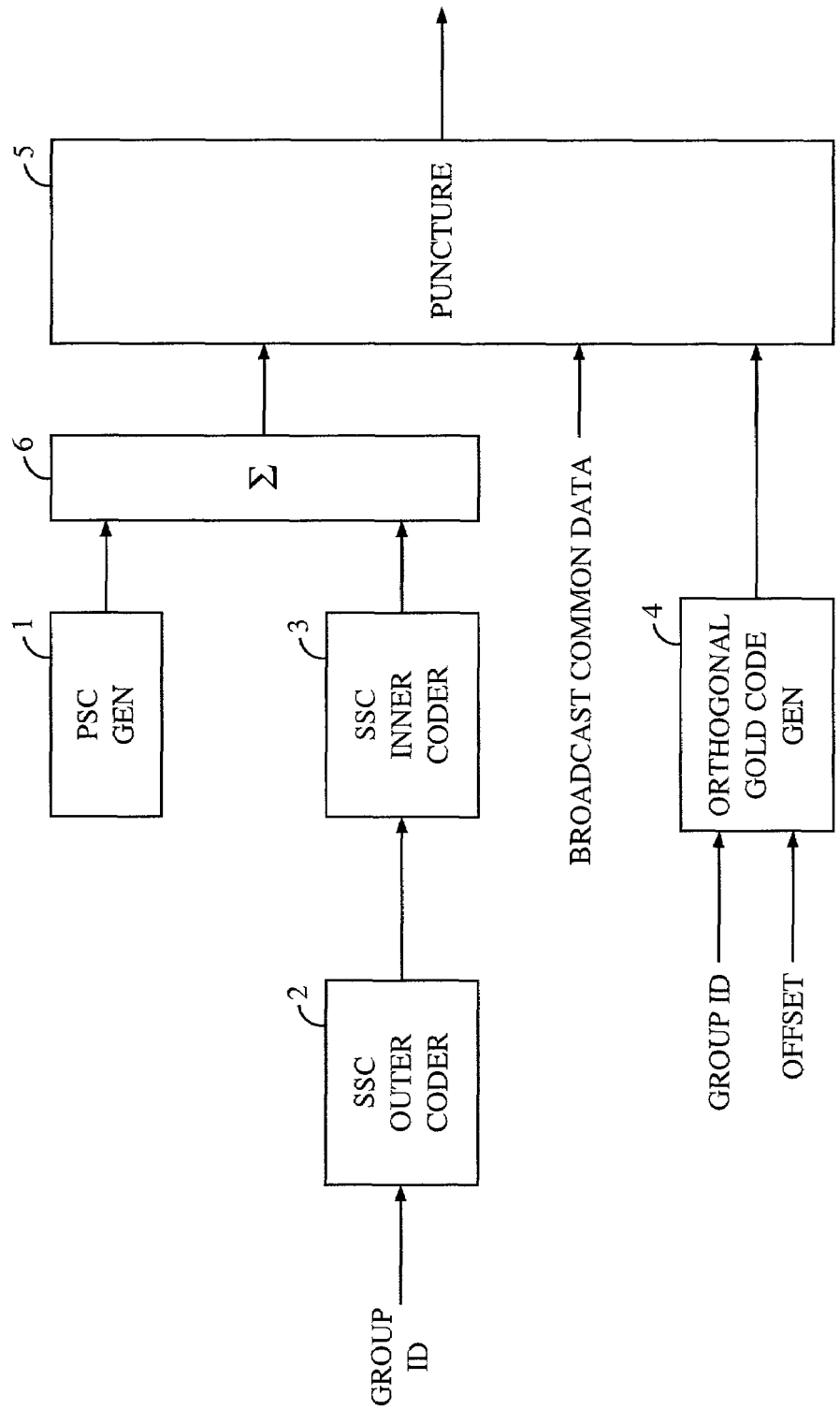
FIG. 2 is a block diagram of an apparatus used to transmit a WCDMA PERCH channel in accordance with prior art methods of synchronization.
Figure 3:
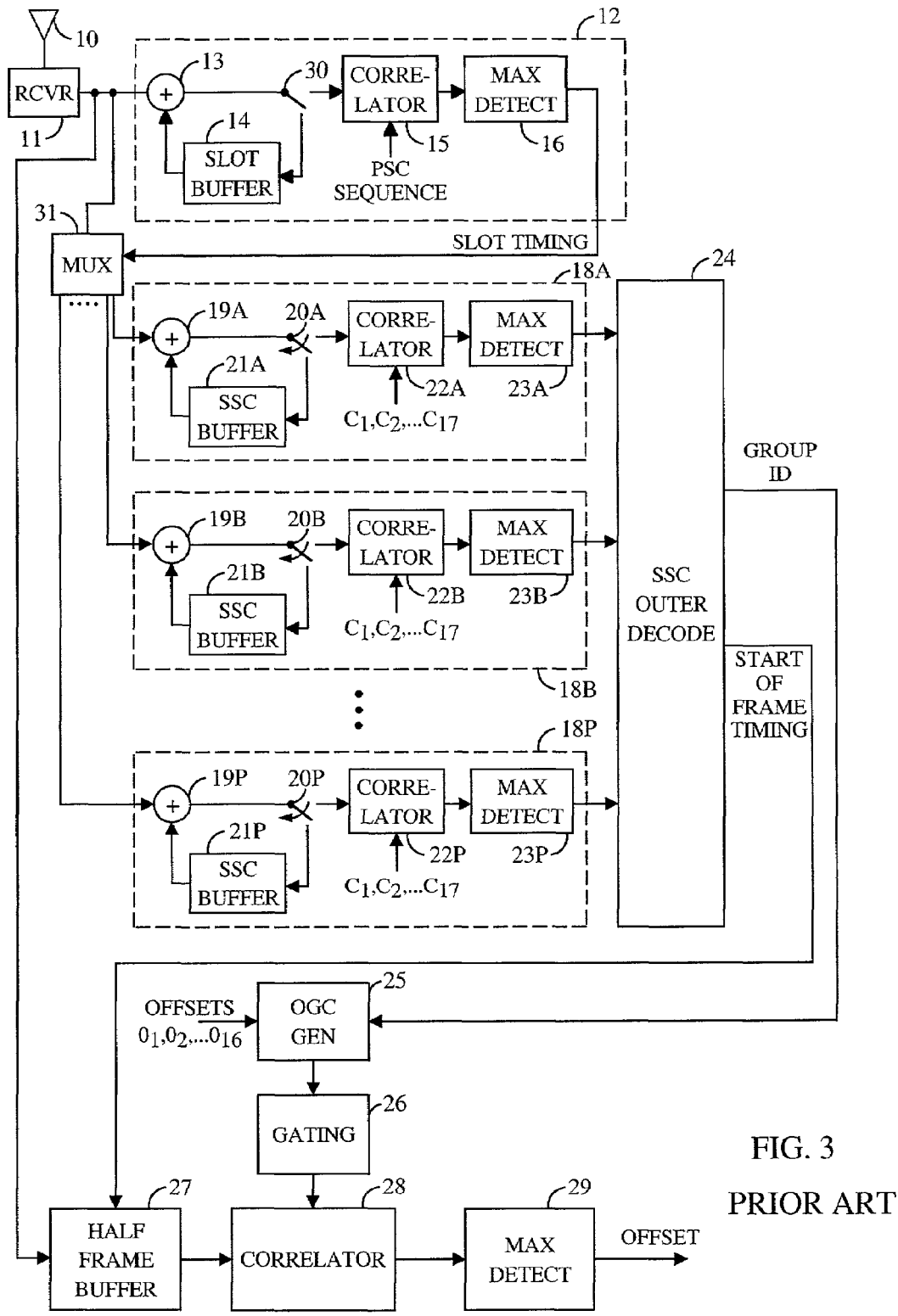
FIG. 3 is a block diagram of an apparatus used to acquire synchronization in a WCDMA system in accordance with prior art methods.
Figure 4:
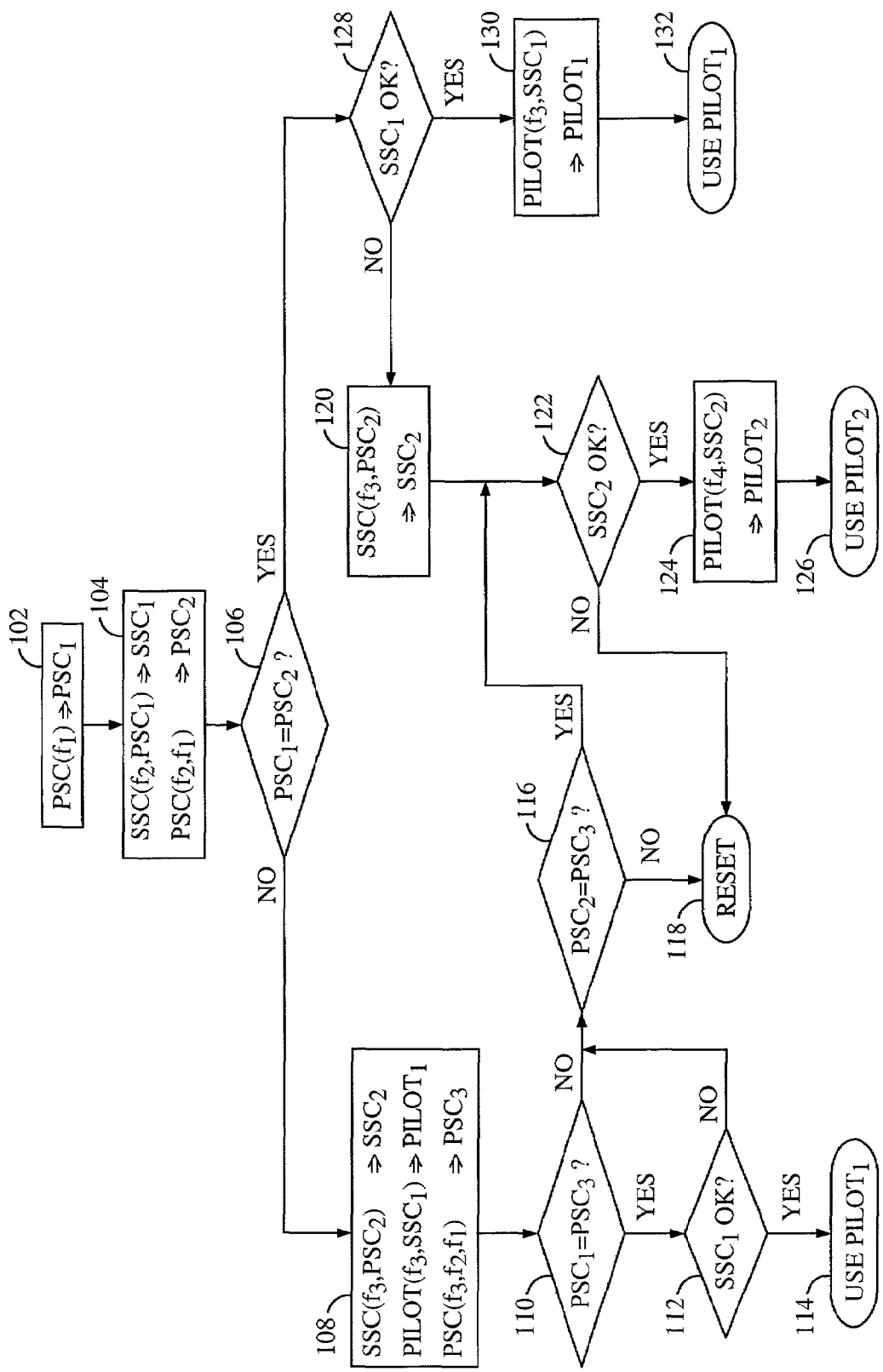
FIG. 4 is a diagram of a method of acquiring synchronization in a WCDMA system in accordance with an embodiment of the invention.

FIG. 4 shows a flowchart of the method used to acquire timing and synchronization between a mobile station and a base station using the proposed WCDMA PERCH channel structure in accordance with an embodiment of the invention. The method starts with the step of sampling the downconverted input signal over one or more slots. As described in the discussion of FIG. 1, each WCDMA frame contains 16 slots, each slot being 2560 chips long. The PSC sequence is transmitted in the first 256 chips of each slot.

In order to synchronize the acquisition system to the slot timing of the received signal, the primary synchronization code (PSC) sequence is correlated with the data received over a first period $f_1$. This step 102 is shown with a formula PSC($f_1$)=>PSC$_1$, indicating that samples collected over slots in frame period number one are used to correlate with the PSC sequence to arrive at a first estimate of slot timing, PSC$_1$.

In an exemplary embodiment of the invention, the PSC slot timing estimate is formed by accumulating samples over multiple slot periods. This is accomplished by using a slot sample buffer large enough to hold sampled data for one slot period, and then adding the subsequent samples collected over the following slot periods. For example, if the received signal is sampled at half-chip intervals, a slot sample buffer having 5120 sample bins would be used to perform PSC slot timing estimation. After storing 5120 for the first slot period being estimated into each of the 5120 sample bins, each sample collected over the second slot period is added to a corresponding bin. In this way, BIN$_1$ would contain the sum of samples $S_1+S_{5121}+S_{10241}$ and so forth. Since the PSC sequence is constant, and is transmitted in the same place in each slot, this "soft combining" accumulation method results in a better estimate than is possible over a single slot period.

In the preferred embodiment, the correlation between received samples and the PSC sequence is measured using a digital matched filter. For example, if the samples received during 16 consecutive slot periods are accumulated into 5120 half-chip sample bins, a PSC digital matched filter is used to measure correlation of the 512-sample PSC sequence with each of the 5120 possible 512-bin groupings. The 5120-bin slot sample buffer is implemented as a circular buffer that allows wrap around addressing to generate digital matched filtering correlation energies at all possible offsets within the slot period. For example, to create a 512-bin period with an offset of 5100, the matched filter would be correlated with the bin numbers 5100 to 5120, followed by bins 1 through 491.

Though the invention is described here using digital matched filters, one skilled in the art will appreciate that other forms of correlation, such as analog matched filters or multiply-and-integrate circuits could also be used without departing from the present invention.

In the preferred embodiment of the present invention, the sampling step entails complex sampling as is well known in the art. Other forms of sampling, including but not limited to real sampling, could also be used without departing from the present invention.

In the preferred embodiment of the invention, the samples are collected at half-chip intervals. A received 256-chip PSC sequence, therefore, would be represented within 512 sample intervals. In using complex samples, the received sample stream would be evaluated for correlation over 1024 samples, 512 in-phase (I) samples, and 512 quadrature-phase (Q) samples.

In the preferred embodiment of the invention, the first period $f_1$, during which data is accumulated and used for PSC synchronization, is a full frame period (16 slot). The first period $f_1$, however, could be any number of slot periods, including fewer than 16 slots or any multiple of 16 slots, without departing from the present invention. Step 104 shows the processing performed on samples received during a second period $f_2$ which follows step 102. In step 104, slot timing from estimate PSC$_1$ is used to decode the secondary synchronization code (SSC) information, as indicated by the formula "SSC($f_2$,PSC$_1$)=>SSC$_1$". Decoding the SSC code word is a two-stage process consisting of decoding the SSC symbol residing in each slot, and then decoding the SSC code word from the generated SSC symbols.

The first stage of decoding SSC symbols is performed based on the assumption that the available slot timing estimate is correct. In an exemplary embodiment of the invention for a WCDMA system, slot timing estimate PSC$_1$ is used to establish the location of the first 256 chips of each of the sixteen slots in every frame. Over period f2, the samples for each of the sixteen 256-chip periods are accumulated into SSC sample accumulation buffers. In an exemplary embodiment of the invention, period f2 is an integer multiple of frame periods in length. In the case of WCDMA, the sixteen 256-chip buffers may be implemented as a single, 4095-chip buffer divided into sixteen sections. The accumulated sample values in each buffer or buffer section are then matched against the possible transmitted SSC code symbols. In the case of WCDMA, there are seventeen different possible 256-chip SSC code symbols. For the SSC symbol in each slot, the SSC symbol sequence having the highest degree of correlation with the values in the corresponding SSC sample accumulation buffer is selected as the most-likely SSC code symbol.

The second stage of SSC decoding is identifying the SSC code word from the estimated SSC code symbols. In WCDMA, the SSC code words are selected from a comma-free subset of a Reed-Solomon block code. The sixteen selected SSC code symbols are resolved to a Reed-Solomon code word, which is then shifted as necessary to equate to one of the comma-free subset allowed. The number of shifts necessary are used to identify frame timing (which slot comes first), and the SSC code word identified identifies the group identification (GI).

In the preferred embodiment of the invention, the PSC sample values received during the second period $f_2$ are accumulated into the slot sample buffer already containing the accumulated samples received during first period $f_1$. This means that, during step 104, as indicated by the formula "PSC($f_2$,$f_1$)=>PSC$_2$", PSC$_2$ is derived from samples collected over both periods $f_1$ and $f_2$. In an alternate embodiment, the slot sample buffer is cleared at the beginning of period $f_2$, so that PSC$_2$ is formed using samples from period $f_2$.

After completing step 104, PSC$_1$ is compared with new estimate PSC$_2$ in step 106. If PSC$_1$ is equal to PSC$_2$, then PSC$_1$ is deemed valid for use in slot timing. If PSC$_1$ is not yet deemed valid in step 106, then SSC$_1$, which was generated based on slot timing in PSC$_1$, is questionable and is not yet used for frame timing estimation.

If it is determined that PSC$_1$ is questionable (not equal to PSC$_2$), step 108 is performed, wherein data from a third period $f_3$ is used to estimate received data. In this step, as indicated by the formula "SSC($f_3$,PSC$_2$)=>SSC$_2$", data received during a third period $f_3$ is used to form SSC$_2$, a second estimate of the SSC code word. In addition, during step 108, an additional estimate of slot timing is made, based on data received in the third period $f_3$, to generate $PSC_3$. As in step 104, the accumulated samples used to generate the previous estimate $PSC_2$ are utilized in generation of $PSC_3$. Again, an alternative embodiment creates $PSC_3$ based on samples received during period $f_3$ only.

One skilled in the art will appreciate that the number of successive unchanged PSC estimates required by the validity test may be more than the two described without use of inventive faculties. For example, three or four identical SSC slot timing estimates in a row may be required before the SSC slot timing estimate is considered valid.

Additionally, pilot channel data is decoded from data received during period $f_3$, based on the frame timing and group identification provided from $SSC_1$, to form pilot offset estimate $PILOT_1$. In determining pilot channel offset, received samples are only correlated against the 16 pilot offsets specified by the group identification (GI) associated with $SSC_1$.

At step 110, $PSC_1$ is compared with new estimate $PSC_3$. If $PSC_1$ is equal to $PSC_3$, then $PSC_1$ is deemed valid for use in slot timing. If $PSC_1$ is deemed valid, then $SSC_1$, which based its slot timing on $PSC_1$, is evaluated and tested for validity in step 112. In an exemplary embodiment, the SSC validation in step 112 is based on the number of SSC symbol errors detected during the formation of $SSC_1$. These symbol errors are measured by counting the number of symbols decoded during the first stage of SSC decoding which do not agree with the symbols of the nearest SSC code word decoded in the second stage. If this number of symbol disagreements (also called Hamming distance) is greater than a predetermined value, $SSC_1$ is deemed invalid. In another embodiment of the invention, step 112 uses a combination of Hamming distance and the correlation energies of the decoded SSC symbols to determine whether the confidence level of a SSC decoding rises to the level required for validity. If $SSC_1$ is deemed valid in step 112, then $PILOT_1$ is used as an estimate of pilot offset in step 114.

In an alternative embodiment of the invention, no maximum is placed on the allowable number of symbol errors received in conjunction with SSC estimations. The best estimate of received SSC code word is immediately used, and steps 112 and 128 are omitted.

In the preferred embodiment of the invention, a correlation strength metric is generated for each decoded SSC symbol. This correlation strength metric is a measure of the degree of correlation between the estimated transmitted symbol value and the received signal, and is generated during the first stage of the two-stage SSC decoding method described above. The correlation strength metrics, along with the estimated received symbols, are used as input for the Chase algorithm to determine the received SSC code word. The Chase algorithm is an improved method of performing "soft decision" decoding of block codes, and was described in an article by David Chase in "IEEE TRANSACTIONS ON INFORMATION THEORY, VOL. IT-18, NO. 1, JANUARY 1972". The use of the Chase algorithm provides improvement in SSC decoding accuracy of as much as 2 dB for additive white Gaussian (AWGN) channels, and 6–8 dB for fading channels.

If $PSC_1$ is deemed invalid at step 110, then $PSC_2$ is compared with new estimate $PSC_3$ in step 116. If $PSC_2$ is not equal to $PSC_3$, then $PSC_2$ is deemed invalid or questionable for slot timing. In the preferred embodiment of the invention, if samples collected over periods $f_1$, $f_2$, and $f_3$ have been accumulated into the PSC slot sample buffer at step 116, but a good slot timing estimate has still not been obtained, the process resets and starts over at step 118, returning to step 102.

If, at step 116, $PSC_2$ is equal to $PSC_3$, then $PSC_2$ is deemed valid for slot timing. If $PSC_2$ is deemed valid, then $SSC_2$, which based its slot timing on $PSC_2$, is evaluated in step 122. In the preferred embodiment of the invention, step 122 uses the same SSC evaluation methods as step 112. If $SSC_2$ is deemed valid in step 122, then $SSC_2$ is used in step 124 to decode pilot channel data from data received during a fourth period $f_4$. The $PILOT_2$ data decoded in step 124 is then made available for use in step 126.

If, after evaluating the validity of $PSC_1$ at step 106, $PSC_1$ is determined to be valid, then $SSC_1$ is evaluated for validity in step 128. In the preferred embodiment of the invention, step 128 uses the same SSC evaluation methods as step 112.

If $SSC_1$ is deemed invalid during step 128, then data received during a third period $f_3$ is used in step 120 to generate another SSC estimate, $SSC_2$. Though step 120 is shown in the figure as using $PSC_2$ to generate $SSC_2$, $PSC_1$ could be used in step 120 to obtain the same result. After step 120, the resulting $SSC_2$ is evaluated in step 122, which has already been described above.

If, in step 128, $SSC_1$ is deemed valid for use in frame timing, then $SSC_1$ is used with data received during a third period $f_3$ to decode the pilot information in step 130. The product of step 130 is $PILOT_1$, which is subsequently made available for use by the system in step 132. Period $f_3$ is one or more frames in length.

In steps 108 and 120, alternative embodiments of the invention add symbol estimates collected during periods $f_2$ and $f_3$ in generating $SSC_2$. In other words, $SSC_1$ is used strengthen the estimate $SSC_2$.

In other alternate embodiments of the invention, evaluation of the validity of a PSC slot timing estimate in steps 106, 110, and 116 is performed by evaluating the degree of correlation resulting from the matched filtering used to generate PSC estimates. For example, when half-chip samples are used, then each slot period contains 5120 samples, which are accumulated into 5120 sample bins. The PSC sequence is correlated at each of the 5120 possible offsets to yield a set of 5120 correlation energies. The highest correlation energy is the PSC best estimate energy, and the slot timing offset corresponding to that correlation energy is the PSC best estimate offset. In order to be considered a valid reference for SSC decoding, the PSC best estimate energy is compared to the next-highest of the remaining 5119 correlation energies. As the samples of additional slots are accumulated into the accumulation buffer, the PSC best estimate energy rises farther and farther above all other correlation energies. In one embodiment of the invention, the PSC best estimate offset is deemed reliable only if the PSC best estimate energy exceeds the next highest correlation energy by a predetermined threshold multiplier, for example 6 dB.

The timing of the received PSC code may be such that it results in high correlation energies in two or three adjacent offsets. Recognizing this possibility, an alternative embodiment of the invention compares the PSC best estimate energy only to offsets which are not immediately adjacent to the PSC best estimate offset. In an exemplary implementation of this method, the four highest correlation energies and their offsets are saved as all offsets are correlated to the PSC sequence, and the PSC best estimate energy is compared to the next highest correlation energy which does not belong to an adjacent offset.

Another alternative embodiment of the invention is useful where the autocorrelation function of the PSC sequence followed by 2304 chips of zeroes has an identifiable envelope. In this embodiment, the correlation energies of all offsets are stored into a correlation energy buffer. In an exemplary implementation using half-chip sampling, the correlation energy buffer would hold 5120 correlation energies. The set of correlation energies is then matched with the autocorrelation function of the PSC sequence followed by 2304 chips of zeroes. The offset having the contour closest to this autocorrelation function is the PSC best estimate offset.

Figure 5:
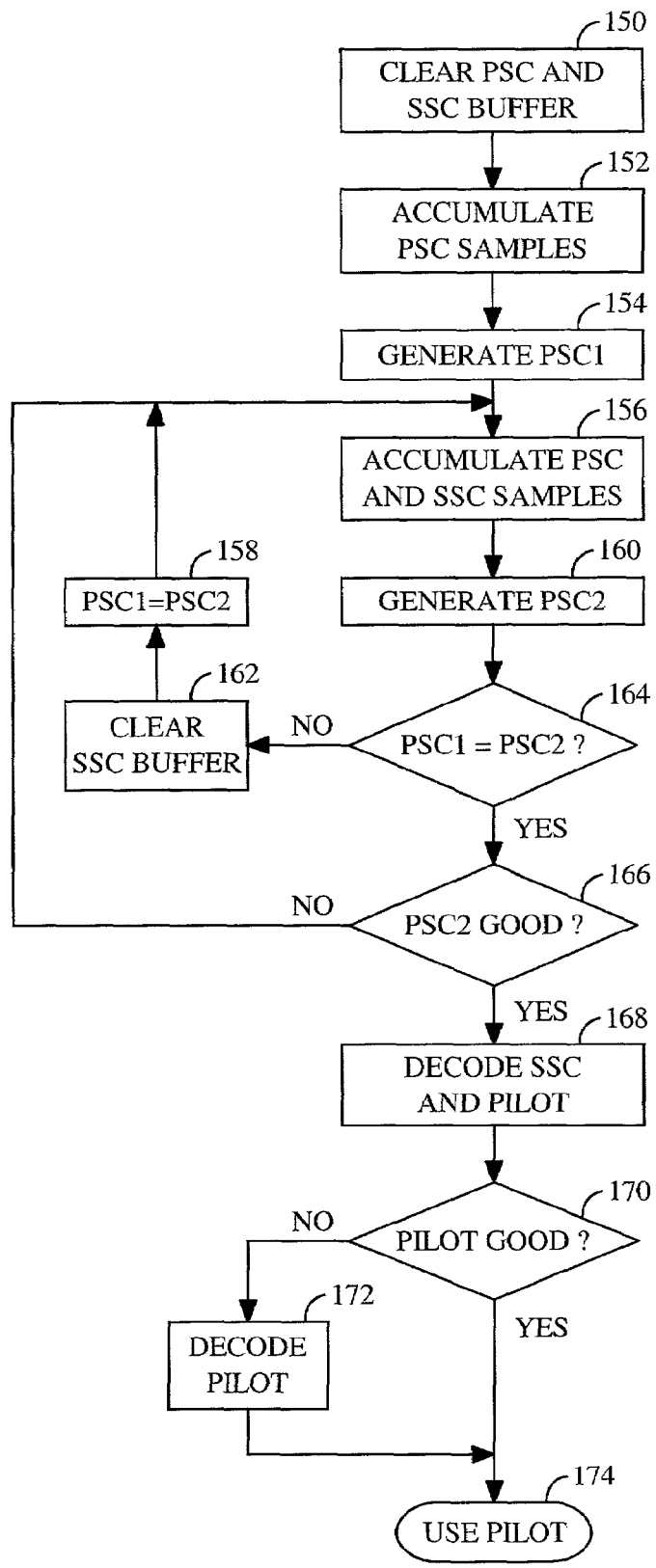
FIG. 5 is a diagram of a method of acquiring synchronization in a WCDMA system in accordance with an alternative embodiment of the invention.

FIG. 5 shows a flowchart of another method of acquire timing and synchronization between a mobile station and a base station using the proposed WCDMA PERCH channel structure in accordance with an embodiment of the invention. The method starts with the step 150 of clearing sample accumulation buffers used to accumulate PSC and SSC samples, setting each bin of each buffer to zero. Samples later received are added to the values already in the bins. The PSC sample accumulation buffer stores enough samples to accumulate an entire slot period of 2560 chips. The SSC sample accumulation buffer stores enough samples to accumulate the first 256 chips of 16 consecutive slots. The SSC sample accumulation buffer has enough bins, therefore, to store 4096 chips worth of samples.

After the PSC and SSC buffers are cleared 150, a first set of samples is received and accumulated 152 into the PSC sample accumulation buffer. In the preferred embodiment of the invention, a full frame (16 slots) of samples are accumulated into the PSC buffer. The sample accumulation 152 is performed as described above in step 102. The PSC sequence is then correlated against the contents of the PSC buffer to generate slot timing estimate PSC1 154. The correlation of the PSC sequence to values in the PSC buffer is done in any of the ways described above.

In step 156, slot timing estimate PSC1 is used to accumulate samples into the SSC sample accumulation buffer. As described above, each sample is accumulated into a PSC buffer bin according to its time offset within its slot. Not all samples are accumulated into the SSC buffer, however. Based on slot timing from estimate PSC1, only samples collected during the first 256 chips of each slot are saved into the SSC buffer. Because the transmitted SSC symbols differ from slot to slot, the sample bins of the SSC buffer are broken into sixteen 256-chip regions, into which the collected samples are accumulated. If the slot timing provided by PSC1 is accurate, each 256-chip region will contain accumulated samples for one slot's SSC symbol period. Because the value of SSC buffer contents depend on the accuracy of PSC1, and to conserve computational resources, the SSC decoding of the SSC buffer contents may be delayed or postponed until PSC1 is shown to be valid.

At the same time that SSC samples are accumulated in step 156, samples are also accumulated into the PSC sample accumulation buffer. In step 160, the contents of the PSC buffer are again analyzed for correlation to the PSC sequence, resulting in slot timing estimate PSC2. In this way, PSC2 is generated from all of the samples accumulated in steps 152 and 156. At step 164, slot estimate PSC1 is compared with slot estimate PSC2. If the two estimates are not equal, then PSC1 is assumed to be inaccurate. The SSC estimate generated using PSC1 is discarded by setting the contents of SSC sample accumulation buffer to zero 162. Slot timing estimate PSC1 is updated to be equal to PSC2 158, and processing continues from step 156. Subsequent SSC estimates will be generated according to slot timing from the new slot timing estimate.

In recognition that slight oscillator drift may cause the PSC estimate to change slightly without completely invalidating SSC accumulation, an alternative embodiment of the invention continues to accumulate SSC samples if the PSC estimate changes at step 164 by a chip or less. In the preferred embodiment of the invention, sampling is performed at half-chip intervals. In such an implementation, PSC sample accumulation buffer has 5120 sample bins, and SSC accumulation buffer has 8192 sample bins. In step 164, if PSC1 differs from PSC2 by only a half-chip (one sample bin), then step 162 is skipped, and step 158 is executed immediately after step 164. In other words, the SSC buffer is not cleared, but the slot timing index, to be used in subsequent SSC sample accumulation, is updated.

Also evaluated at step 164 is the number of frames which have been accumulated into the PSC sample accumulation buffer. If a predetermined number of frames, for example 10, have elapsed with no apparent stabilization in the PSC slot timing estimate, the PSC sample accumulation buffer is cleared (filled with zeroes) and processing optionally continues at step 152 or aborts.

The validity of PSC1 and PSC2 are further evaluated using one of the methods described above in conjunction with steps 106, 110, and 116. In one embodiment of the invention, step 160 includes saving the second-highest correlation energy as well as PSC2. At step 166, PSC2 is evaluated for validity by comparing it to the correlation energies of other offsets. A PSC slot timing estimate is deemed valid only if its correlation energy exceeds the correlation of every other offset by a predetermined amount, for example 6 dB.

In another embodiment of the invention, step 160 includes saving the four highest correlation energies as well as their offsets. At step 166, a PSC slot timing estimate is deemed valid only if its correlation energy exceeds the correlation of every other non-adjacent offset by a predetermined amount, for example 6 dB.

In another alternative embodiment of the invention, the correlation energies for all offsets are stored into a correlation energy buffer at step 160. At step 166, a PSC slot timing estimate is deemed valid only if the values stored in the correlation energy buffer evaluated at that offset most closely match the autocorrelation function of the PSC sequence followed by 2304 chips of zeroes.

The SSC samples stored using a PSC slot timing estimate are not decoded unless the PSC slot timing estimate is deemed valid. If, at step 166, PSC2 is deemed invalid, then processing continues from step 156, so that the PSC estimate can be strengthened by further sample accumulation. If, at step 166, PSC2 is deemed valid, then the decoding of SSC and pilot information continue in step 168.

In one embodiment of the invention, the SSC code word is decoded in step 168 using the aforementioned Chase algorithm. The first time an SSC code word is decoded, there may not be a sufficient degree of confidence in it to call it valid. Subsequent samples are accumulated into the SSC sample buffer until the SSC code word is decoded and validated. Just in case the SSC code word is later found to be valid, the pilot offset is estimated based on the best guess of the SSC information at the same time that additional SSC samples are being accumulated.

After a valid SSC code word has been decoded in step 168, the pilot offset generated in step 168 is evaluated in step 170. If the pilot offset was generated based on the SSC code word eventually found to be valid, then the pilot offset measured in step 168 is used 174. If the SSC code word decoded was not used to generate the pilot offset available at step 170, then the pilot offset is decoded in step 172 based on the valid SSC code word. After the pilot offset is decoded in step 172, it is ready for use in step 174.

In another embodiment of the invention, a frame sample accumulation buffer (large enough to hold accumulated samples over an entire frame) is used for decoding of PSC, SSC and pilot information. Samples are accumulated over enough frame periods that PSC, SSC, and pilot may be decoded with high confidence. Once the slot timing is established, the buffer may be organized into 16 slots. The accumulated samples in the first 256 chips of each buffer slot are immediately analyzed to decode the SSC code word. Once the SSC code word has been decoded, the pilot offset is decoded from the last 1280 chips of each buffer slot. The samples from additional frame periods may be accumulated in the buffer as necessary to generate valid PSC, SSC, and pilot information. PSC and SSC decoding techniques described above, including use of PSC correlation and autocorrelation, SSC symbol correlation energy measurement and the Chase algorithm for decoding the SSC, are equally applicable to this frame accumulation method. This method requires a rather sizeable sample accumulation buffer (81,920 bins if half-chip samples are used), but allows decoding of PSC, SSC, and pilot information in a small number of frames (theoretically as little as 10 milliseconds).

In an alternative embodiment, a pilot sample accumulation buffer large enough to accumulate samples for the portion of each slot in a frame period containing the pilot code is used for decoding pilot information. In the case of WCDMA, the pilot sample accumulation buffer is divided into sixteen sections of 1280 chips. Sample accumulation in this buffer may begin as soon as a PSC slot timing estimate is generated. If the PSC slot timing estimate used for pilot sample accumulation changes, the pilot sample accumulation buffer is cleared, and pilot sample accumulation resumes based on the new PSC slot timing estimate. Or, in an alternative embodiment, the pilot sample accumulation buffer is only cleared if the PSC estimate changes by more than one sample offset. Once the SSC code word is successfully decoded, hence identifying the frame timing and Group Identification, the sections in the pilot sample accumulation buffer are immediately correlated with the Gold code offsets indicated by the SSC's Group Identification. No further sample periods are needed beyond those required to decode the SSC code word.

Figure 6:
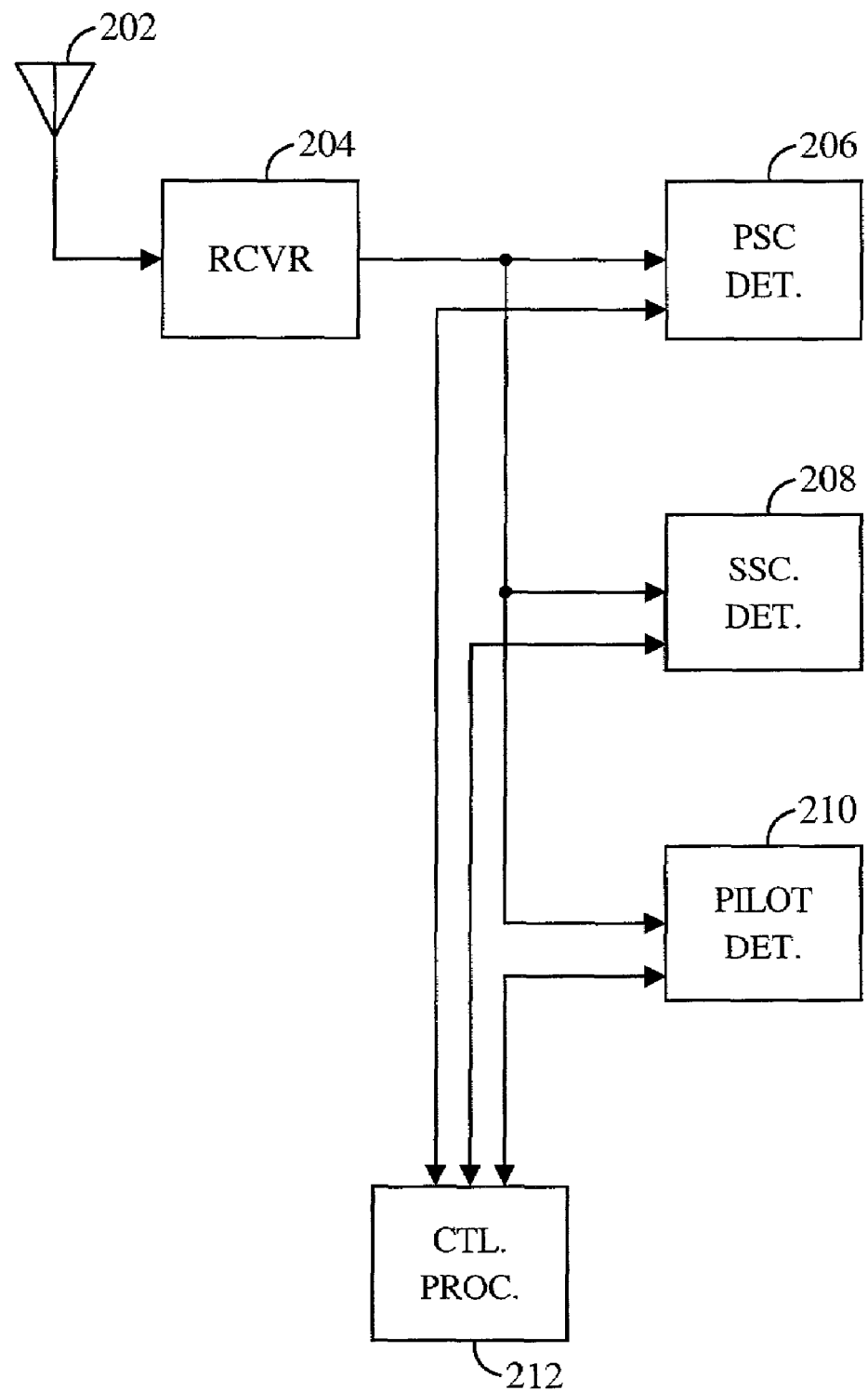
FIG. 6 is a high level block diagram of an apparatus used to acquire synchronization of a WCDMA signal in accordance with an embodiment of the invention.

FIG. 6 shows a high-level block diagram of a receiver configured in accordance with an embodiment of the invention. The apparatus depicted allows parallel processing of received samples based on the potential correctness of early PSC and SSC estimates. The signals carrying primary synchronization code (PSC), secondary synchronization code (SSC), and pilot information are received at antenna 202, and are downconverted, complex PN despread, and complex sampled in receiver (RCVR) 204. The resultant stream of complex samples are sent to PSC detector 206, SSC detector 208, and pilot detector 210. PSC detector 206, SSC detector 208, and pilot detector 210 are also operably coupled to control processor 212.

Control processor 212 sends control signals to PSC detector 206, SSC detector 208, and pilot detector 210 commanding them to begin searching for a pilot signal or to abort a search in progress.

PSC detector 206 evaluates the samples received from receiver 202 over several slot periods to generate an estimate of slot timing. The operations performed by PSC detector 206 are the same as the operations used to generate PSC slot timing estimates as described above in conjunction with steps 102, 104, and 108. PSC detector 206 provides SSC detector 208 with the PSC slot timing estimates through the connection shown.

At the same time that PSC detector 206 is generating additional slot timing estimates, SSC detector 208 uses slot timing estimates already generated by PSC detector 206 to decode the SSC code word from subsequent samples provided by receiver 204. The operations performed by SSC detector 208 are the same as the SSC operations described above in conjunction with steps 104, 108, and 120. SSC detector 208 provides pilot detector 210 with frame timing estimates through the connection shown.

At the same time that SSC detector continues to decode subsequent SSC samples, pilot detector 210 uses frame timing and group identification information provided by SSC detector 208 to estimate the pilot channel offset using subsequent samples provided by receiver 204. The operations performed by pilot detector 210 are the same as the pilot offset determination operations described above in conjunction with steps 108, 124, and 130.

Figure 7:
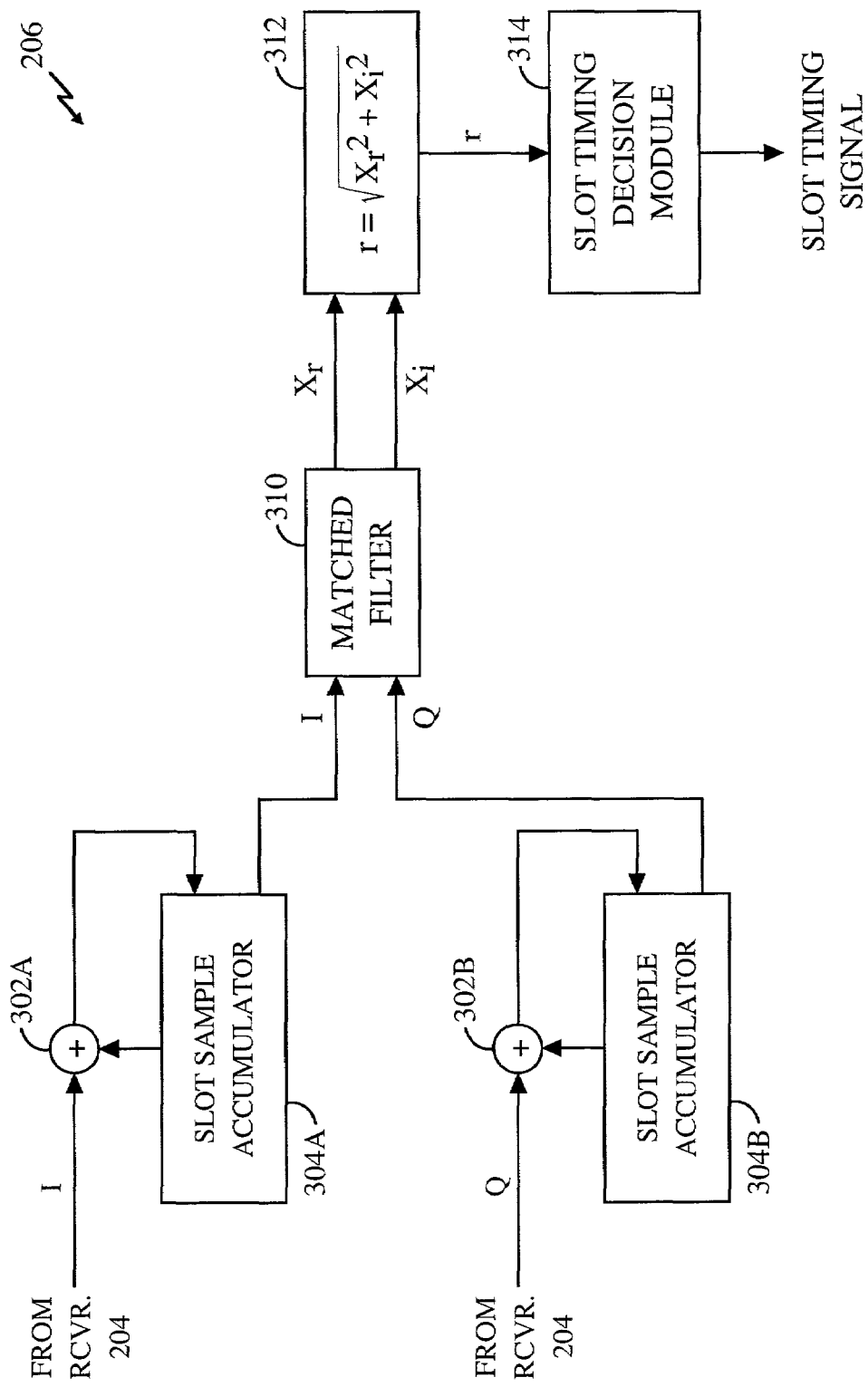
FIG. 7 is a block diagram of a primary synchronization code detection apparatus configured in accordance with an embodiment of the invention.

FIG. 7 is a detailed block diagram of a preferred embodiment of PSC detector 206. In an exemplary embodiment of the invention, slot sample accumulators 304 are implemented as first-in first-out (FIFO) buffers, having one sample bin for each of the sample positions in a single slot period. For example, half-chip samples would require a 5120-sample slot buffer. At the beginning of channel acquisition, slot sample accumulators 304 are cleared upon receiving a command or signal from control processor 212. Thereafter, each time a sample with a slot offset is received at summing block 302, it is added to the value for that slot offset retrieved from accumulator 304. The resultant sum is stored into the sample bin associated with that slot offset within accumulator 304. Summing block 302*a* and accumulator 304*a* receive in-phase (I) samples and accumulate I values in the sample bins of accumulator 304*a*. Summing block 302*b* and accumulator 304*b* receive quadrature-phase (Q) samples and accumulate Q values in the sample bins of accumulator 304*b*.

In an embodiment of the invention which accumulates samples over entire frame periods, slot sample accumulators 304 are large enough to accumulate the number of samples in an entire frame period. In the case of half-chip samples, this means that slot sample accumulators 304 each have 81,920 bins.

After accumulating samples over several slot periods, matched filter 310 is provided with sample bin values from accumulators 304 and measures PSC sequence correlation throughout the sample bin regions. In the preferred embodiment of the invention, samples are accumulated over multiple frame periods (16 slots each in the case of WCDMA). Matched filter 310 measures a real and imaginary correlation energy value for each possible slot timing offset. In the case where half-chip samples are used in a WCDMA system, this would result in 5120 real and 5120 imaginary correlation energy values. As described for step 102, the sample bins are used as a circular, or wrap-around buffer when evaluating offsets close to the end of the buffer. For example, to create a 512-sample period with an offset of 5100, values from bin numbers 5100 to 5120, followed by bins 1 through 491 would be used as input to digital matched filter 310.

The real and imaginary correlation energies for each slot offset generated by matched filter 310 are provided to complex-to-scalar converter block 312. As indicated in the figure, converter block 312 takes the real and imaginary components for each offset and combines them according to equation (2):

$$r = \overline{x_r^2 + x_i^2},\qquad(2)$$

where $x_r$ is the real component of the correlation energy for a slot offset, $x_i$ is the imaginary component of the correlation energy for the slot offset, and r is the scalar magnitude of the correlation energy vector for the slot offset.

The set of scalar correlation energy values generated by complex-to-scalar converter block 312 are provided to slot timing decision module 314, which identifies the most likely PSC slot boundary offset by selecting the offset with the greatest correlation. The determination of validity of a PSC may be done using the methods previously described for steps 106, 110, and 116. Slot timing decision module 314 generates a slot timing signal, which is provided to SSC detector 208.

As described above, in an embodiment of the invention which compares the complete set of correlation energies with an autocorrelation envelope of the PSC sequence, slot timing decision module 314 includes a correlation energy buffer having the same number of bins as a slot sample accumulator 304.

Figure 8:
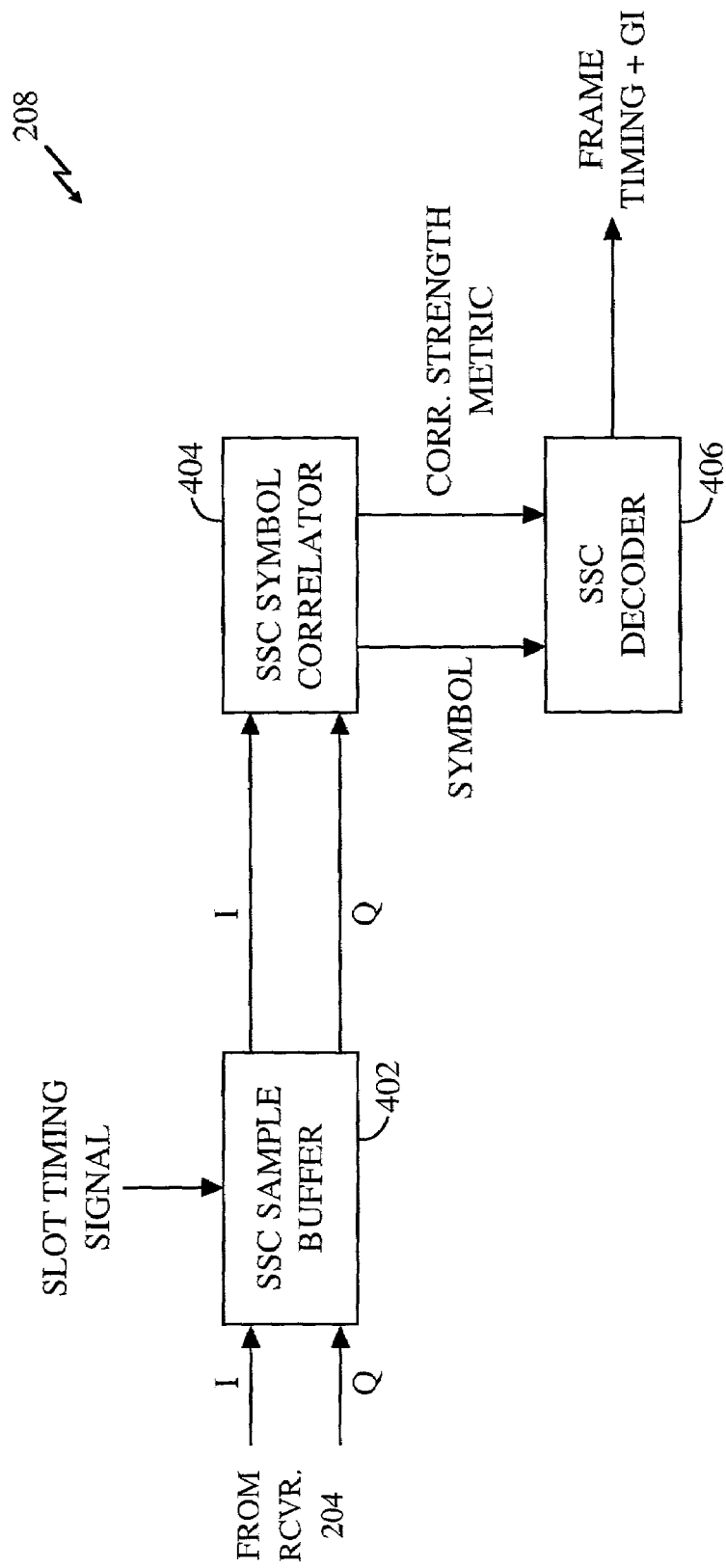
FIG. 8 is a block diagram of a secondary synchronization code decoder apparatus configured in accordance with an embodiment of the invention.

FIG. 8 is a detailed block diagram of a preferred embodiment of SSC detector 208. I and Q samples from receiver 204 are received by SSC sample buffer 402, along with the slot timing signal provided by PSC detector 206. SSC sample buffer 402 collects samples for the one symbol per slot which is expected to contain SSC symbols. In WCDMA, for example, SSC symbols are transmitted in the first 256 chips, and therefore in the first symbol position of each slot.

The I and Q samples collected over the SSC symbol period are provided to SSC symbol correlator 404, which determines which of the possible SSC symbols has the highest correlation energy to the samples in the SSC symbol period. In an exemplary embodiment in which the SSC symbols are Walsh codes, SSC symbol correlator 404 is a fast Hadamard transform (FHT) module.

SSC symbol correlator 404 generates decoded SSC symbols and provides them to SSC decoder 406. When SSC decoder 406 has been provided with one SSC symbol for each slot in a frame period, SSC decoder 406 performs block decoding of the SSC code word to determine group identification (GI) and frame timing. As discussed above, WCDMA uses a comma-free SSC code, which enables the identification of slot position within a frame from the symbols of the decoded SSC code word. The decoded SSC code word also uniquely identifies the one of sixteen group identification (GI) values for use in subsequent pilot channel decoding. Both the frame timing signal and GI generated by SSC decoder 406 are provided to pilot detector 210.

In the preferred embodiment of the invention, SSC symbol correlator 404 also generates a correlation strength metric for each decoded SSC symbol, and provides this metric to SSC decoder 406. In the preferred embodiment of the invention, SSC decoder 406 is a Reed-Solomon decoder. The correlation strength metrics provided by SSC symbol correlator 404 allow SSC decoder 406 to perform a "soft decision" decoding of the SSC code word in accordance with the aforementioned Chase algorithm.

Figure 9:
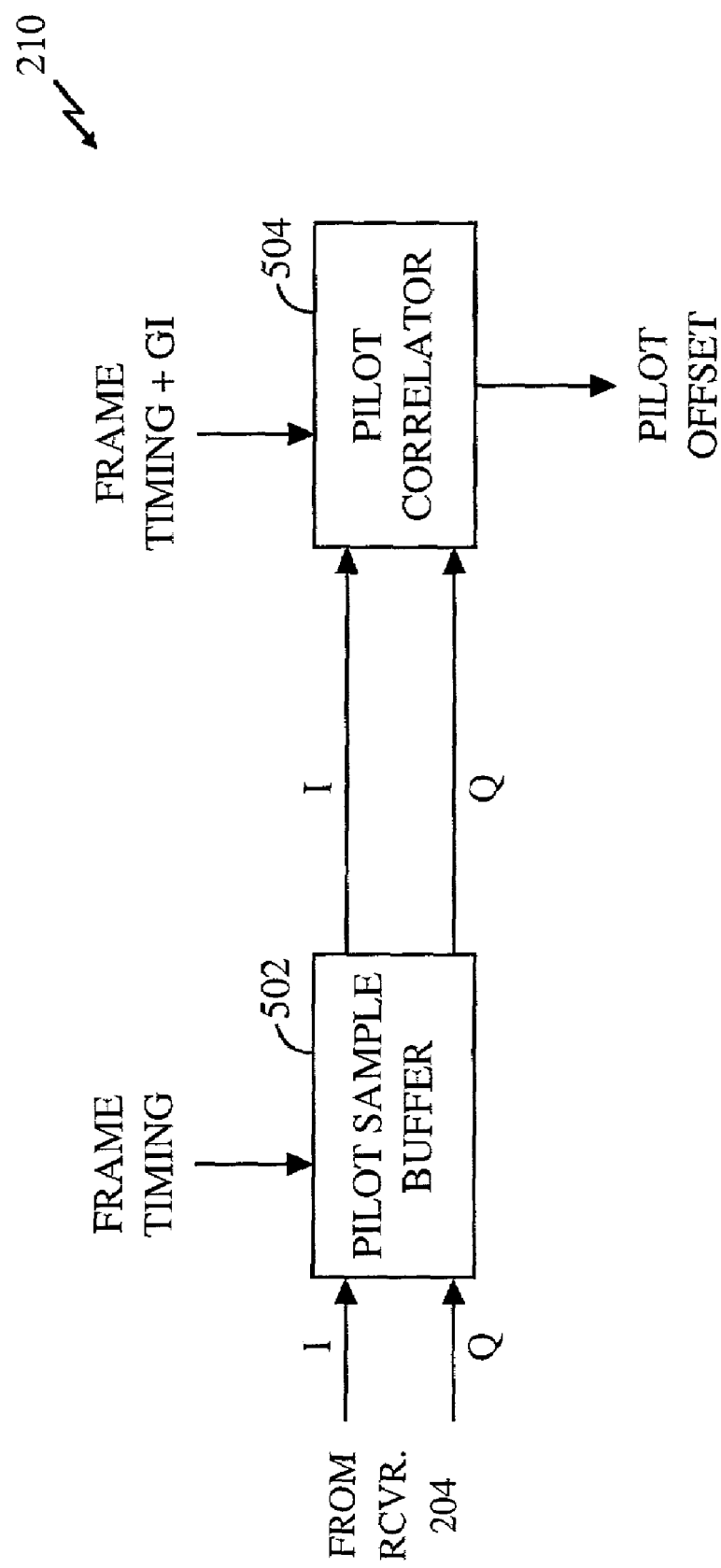
FIG. 9 is a block diagram of a pilot offset detection apparatus configured in accordance with an embodiment of the invention.

FIG. 9 is a detailed block diagram of an exemplary embodiment of pilot detector 210. I and Q samples from receiver 204 are received by pilot sample buffer 502, along with the frame timing signal provided by SSC detector 208. pilot sample buffer 502 collects samples for the portions of each slot expected to contain pilot data. In WCDMA, for example, pilot data is transmitted in the latter half, or the last 1280 chips, of each slot.

The I and Q samples collected by pilot sample buffer 502 are provided to pilot correlator 504, which determines the offset of the pilot Gold code in relation to the start of each frame. Pilot correlator 504 is also provided with group identification (GI) information so that it may be configured to search for only the pilot offsets within the identified group. In WCDMA, for example, each group associated with a GI value contains only 16 of the 32*16 possible pilot offsets.

In an alternative embodiment of the invention, pilot sample buffer 502 is implemented as an accumulator for combining samples of subsequent frame periods with those already collected. This allows an increasingly strong set of sample values used to generate a pilot offsets with a higher degree of confidence.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for receiving a signal, the method comprising:
   sampling the received signal to produce a stream of received samples, the stream of received samples comprising a first set of received samples followed by a second set of received samples;
   correlating said first set of received samples with a primary synchronization code to form a first slot timing estimate;
   generating a second slot timing estimate based at least in part on said second set of received samples;
   decoding a secondary synchronization code word based on said first slot timing estimate, said second slot timing estimate and said second set of received samples; and
   testing a validity of the first slot timing estimate based on the second slot timing estimate to produce a slot timing validity.

2. The method of claim 1 wherein said decoding comprises testing validity of said first slot timing estimate based on said generating.

3. The method of claim 2 wherein said testing validity of said first slot timing estimate comprises comparing said first slot timing estimate with said second slot timing estimate.

4. The method of claim 2 further comprising determining a validity of said secondary synchronization code word based on said testing validity of said first slot timing estimate.

5. The method of claim 1 further comprising accumulating said first set of received samples over an integer number of slot periods.

6. The method of claim 5 wherein said integer number of slot periods is equal to an integer multiple of a number of slot periods in a frame period.

7. The method of claim 5 wherein said integer multiple is greater than one.

8. The method of claim 1 wherein said accumulating is performed over a period longer than one frame.

9. The method of claim 1 wherein said decoding comprises measuring a correlation between each of a predetermined set of secondary synchronization code words and a predetermined portion of said second set of received samples.

10. The method of claim 1 wherein said measuring utilizes a soft decision block decoding technique.

11. The method of claim 10 wherein said soft decision block decoding technique utilizes the Chase algorithm.

12. A method for receiving a signal, the method comprising:
sampling the received signal to produce a stream of received samples, the stream of received samples comprising a first set of received samples followed by a second set of received samples;
correlating said first set of received samples with a primary synchronization code to form a first slot timing estimate, wherein said correlating comprises:
measuring a correlation of a primary synchronization code sequence with said first set of received samples at each of a predetermined number of bin offsets to form a correlation energy corresponding to each of said predetermined number of bin offsets; and
selecting said first slot timing estimate based on a bin offset having greatest corresponding correlation energy;
generating a second slot timing estimate based at least in part on said second set of received samples; and
decoding a secondary synchronization code word based on said first slot timing estimate, said second slot timing estimate and said second set of received samples.

13. The method of claim 12 wherein said measuring is performed using digital matched filtering.

14. An apparatus for receiving a signal comprising:
sampler for sampling a received signal to produce a stream of received samples, the stream of received samples comprising a first set of received samples followed by a second set of received samples;
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates, wherein said primary synchronization code detector comprises a slot buffer for accumulating received samples into a predetermined number of sample bins, wherein each sample accumulated in the slot buffer is added to a value stored in a sample bin having a sample bin offset corresponding to the sample, and wherein the value stored in the sample bin having the sample bin offset is replaced with the resultant sum; and
secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate.

15. An apparatus for receiving a signal comprising:
sampler for sampling a received signal to produce a stream of received samples, the stream of received samples comprising a first set of received samples followed by a second set of received samples:
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates, wherein said primary synchronization code detector comprises a slot buffer for accumulating received samples into a predetermined number of sample bins, wherein said primary synchronization code detector further comprises a matched filter for measuring a primary synchronization code correlation energy for each of said predetermined number of sample bins; and
secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate.

16. An apparatus for receiving a signal comprising:
sampler for sampling a received signal to produce a stream of received samples, the stream of received samples comprising a first set of received samples followed by a second set of received samples;
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates, wherein said primary synchronization code detector comprises a slot buffer for accumulating received samples into a predetermined number of sample bins, wherein said primary synchronization code detector further comprises a matched filter for measuring a primary synchronization code correlation energy for each of said predetermined number of sample bins, wherein said matched filter performs said measuring using real and imaginary correlation energy values for each of said predetermined number of sample bins; and
secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate.

17. An apparatus for receiving a signal comprising:
sampler for sampling a received signal to produce a stream of received samples, the stream of received samples comprising a first set of received samples followed by a second set of received samples;
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates, wherein said primary synchronization code detector comprises a slot buffer for accumulating received samples into a predetermined number of sample bins, wherein said primary synchronization code detector further comprises a matched filter for measuring a primary synchronization code correlation energy for each of said predetermined number of sample bins, wherein said matched filter performs said measuring using real and imaginary correlation energy values for each of said predetermined number of sample bins; and secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate, and wherein said secondary synchronization code detector further comprises a secondary synchronization channel correlator for choosing the first secondary synchronization code word from a predetermined set of secondary synchronization code words.

18. An apparatus for receiving a signal comprising:
sampler for sampling a received signal to produce a stream of received samples, the stream of received samples comprising a first set of received samples followed by a second set of received samples;
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates; and
secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate, and wherein said secondary synchronization code detector comprises a secondary synchronization code sample buffer for accumulating the selected portion, and wherein said secondary synchronization channel correlator measures a correlation energy for each of said predetermined set of secondary synchronization code words, and wherein said first secondary synchronization code word has the greatest measured correlation energy.

19. An apparatus for receiving a signal comprising:
sampler for sampling a received signal to produce a stream of received samples, the stream of received samples comprising a first set of received samples followed by a second set of received samples;
primary synchronization code detector for accumulating the stream of received samples, forming a first slot timing estimate based on the first set of received samples, forming a second slot timing estimate based at least in part on the second set of received samples, and testing a validity of the first slot timing estimate based on said first and second slot timing estimates;

secondary synchronization code detector for decoding a first secondary synchronization code word based on a selected portion of the second set of received samples and said validity of the first slot timing estimate, wherein the selected portion is selected based on the first slot timing estimate, and wherein the decoding produces a frame timing estimate; and a control processor for testing the validity of the first slot timing estimate based on the second slot timing estimate to produce a slot timing validity.

20. The apparatus of claim 19 wherein said primary synchronization code detector comprises a slot buffer for accumulating received samples into a predetermined number of sample bins.

21. The apparatus of claim 20 wherein said predetermined number is equal to a number of samples in a single slot.

22. The apparatus of claim 20 wherein said predetermined number is equal to an integer multiple of a number of samples in a slot.

23. The apparatus of claim 19 wherein said secondary synchronization code detector comprises a secondary synchronization code sample buffer for accumulating the selected portion.

24. The apparatus of claim 19 further comprising a pilot detector for estimating a pilot channel offset based on the frame timing estimate.

25. The apparatus of claim 19 further comprising a pilot detector for estimating a pilot channel offset based on the frame timing estimate and on the slot timing validity.

26. An apparatus for receiving a signal comprising:
means for sampling the received signal to produce a stream of received samples, the stream of received samples comprising a first set of received samples followed by a second set of received samples;
means for correlating said first set of received samples with a primary synchronization code to form a first slot timing estimate;
means for generating a second slot timing estimate based on said first set of received samples and said second set of received samples;
means for decoding a secondary synchronization code word based on said first slot timing estimate, said second slot timing estimate and said second set of received samples; and
means for testing the validity of the first slot timing estimate based on the second slot timing estimate to produce a slot timing validity.

* * * * *